(12) United States Patent
Choi

(10) Patent No.: US 7,546,985 B1
(45) Date of Patent: Jun. 16, 2009

(54) CABLE GUIDE DEVICE FOR INDUSTRIAL ROBOT

(76) Inventor: Kwang Sul Choi, 3-1313 Dongdeok Hundai Apt., 329, Boksan-dong, Jung-gu, Ulsan City (KR) 681-752

( * ) Notice: Subject to any disclaimer, the term of this patent is extended or adjusted under 35 U.S.C. 154(b) by 0 days.

(21) Appl. No.: 11/953,707

(22) Filed: Dec. 10, 2007

(51) Int. Cl.
*F16L 3/00* (2006.01)

(52) U.S. Cl. .................. 248/49; 248/62; 248/229.1; 74/490.02

(58) Field of Classification Search ............ 248/49, 248/51, 62, 74.1, 74.4, 660, 229.1; 414/680, 414/729, 730, 918; 74/490.02; 901/50; 138/106–108, 138/110, 157, 161, 273
See application file for complete search history.

(56) References Cited

U.S. PATENT DOCUMENTS

| | | | | |
|---|---|---|---|---|
| 5,437,207 A | * | 8/1995 | Zimmer | 74/490.02 |
| 5,443,232 A | * | 8/1995 | Kesinger et al. | 248/62 |
| 5,651,519 A | * | 7/1997 | Goodrich et al. | 248/51 |
| 5,816,736 A | * | 10/1998 | Kroulik | 403/389 |
| 6,431,502 B1 | * | 8/2002 | Goodman | 248/74.1 |
| 6,536,717 B2 | * | 3/2003 | Parker | 248/49 |
| 2001/0052564 A1 | | 12/2001 | Karlinger | |
| 2002/0153459 A1 | * | 10/2002 | Maurice | 248/74.4 |
| 2002/0158171 A1 | * | 10/2002 | Karlinger | 248/49 |

FOREIGN PATENT DOCUMENTS

| | | |
|---|---|---|
| KR | 1020050064339 A | 6/2005 |
| KR | 100701926 B1 | 3/2007 |

* cited by examiner

*Primary Examiner*—Korie Chan
(74) *Attorney, Agent, or Firm*—Franklin & Assocs. International LLC; Matthew F Lambrinos

(57) ABSTRACT

A cable guide device for an industrial robot is disclosed. The cable guide device includes a tube ring coupled to an end portion of a cable tube of an industrial robot, a cable distributor insertedly coupled in the tube ring and having a plurality of cable inserting holes through which cables introduced into the cable tube pass, a tube clamp rotatably fitted around an outer peripheral surface of the tube ring and having a ring shape, a head coupling unit coupled to the tube clamp, and a clamp supporting unit having a first end portion fitted around an outer surface of an arm of the industrial robot and a second end portion coupled to the head coupling unit, to keep the cable tube at a predetermined distance away from the outer surface of the arm.

5 Claims, 12 Drawing Sheets

CABLE GUIDE DEVICE FOR INDUSTRIAL ROBOT

BACKGROUND

The present invention relates to a cable guide device, and more particularly, to a cable guide device for an industrial robot, which can prevent cables mounted for operation of an industrial robot from being contacted with an outer surface of a robot arm.

Generally, an industrial robot includes an arm which relatively rotates, and a head which is mounted to a front end of the arm to hold various tools. In order to transmit or receive power and a control signal to/from the head, a plurality of cables, such as a power cable, a manipulation cable, a water cable and the like, are arranged along the outer surface of the arm.

Such cables necessary for operation of the industrial robot may obstruct the operation of the robot. To solve this problem, the plurality of cables are enveloped in a cable tube between the arm and the head, and the cable tube is arranged so as not to obstruct the operation within a radius of operation of the industrial robot, and then is connected to a system mounted behind the industrial robot.

However, when the head operates, the cable tube shakes and collides with the outer surface of the arm. Thus, the cables in the cable tube suffer damage.

Describing in detail, when the head operates, the conventional cable tube for an industrial robot suffers friction-induced damage due to contact with the outer surface of the arm and bending due to twist. The friction-induced damage and the bending occurring successively by the operation of the robot arm cause damage to the cables enveloped in the cable tube.

SUMMARY

Therefore, the present invention has been made in view of the above problems, and it is an object of the present invention to provide a cable guide device for an industrial robot, which can protect cables from damage by preventing a cable tube arranged between an arm and a head of a robot from being contacted with the arm and twisted during operation of the head.

Additional objects and/or advantages of the invention will be set forth in part in the description which follows and, in part, will be obvious from the description, or may be learned by practice of the invention.

The objects and other advantages of the invention may be realized and attained by the structure particularly pointed out in the written description and claims hereof as well as the appended drawings.

To achieve these objects and other advantages and in accordance with the purpose of the invention, as embodied and broadly described herein, a cable guide device for an industrial robot to prevent a plurality of cables and a cable tube enveloping the cables between an arm and a head of the industrial robot from being twisted or bent or damaged due to contact with an outer surface of the arm during operation of the robot, comprises: a tube ring coupled to an end portion of the cable tube of the industrial robot; a cable distributor insertedly coupled in the tube ring, the cable distributor having a plurality of cable inserting holes through which the cables introduced into the cable tube of the industrial robot pass; a tube clamp rotatably fitted around an outer peripheral surface of the tube ring, the tube clamp having a ring shape; a head coupling unit coupled to a portion of the tube clamp; and a clamp supporting unit having a first end portion fitted around the outer surface of the arm of the industrial robot and a second end portion coupled to the head coupling unit, the clamp supporting unit keeping the cable tube of the industrial robot at a predetermined distance away from the outer surface of the arm.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings.

Before explaining embodiments of the present invention, it is to be understood that the phraseology and terminology used in the following specification and appended claims should not be construed as limited to general and dictionary meanings but be construed as the meanings and concepts according to the spirit of the present invention on the basis of the principle that the inventor is permitted to define appropriate terms for the best explanation.

The preferred embodiments described in the following specification and shown in the accompanying drawings are illustrative only and are not intended to represent all aspects of the invention, so that it is to be understood that various equivalents and modifications can be made without departing from the spirit of the invention.

Figure 1:
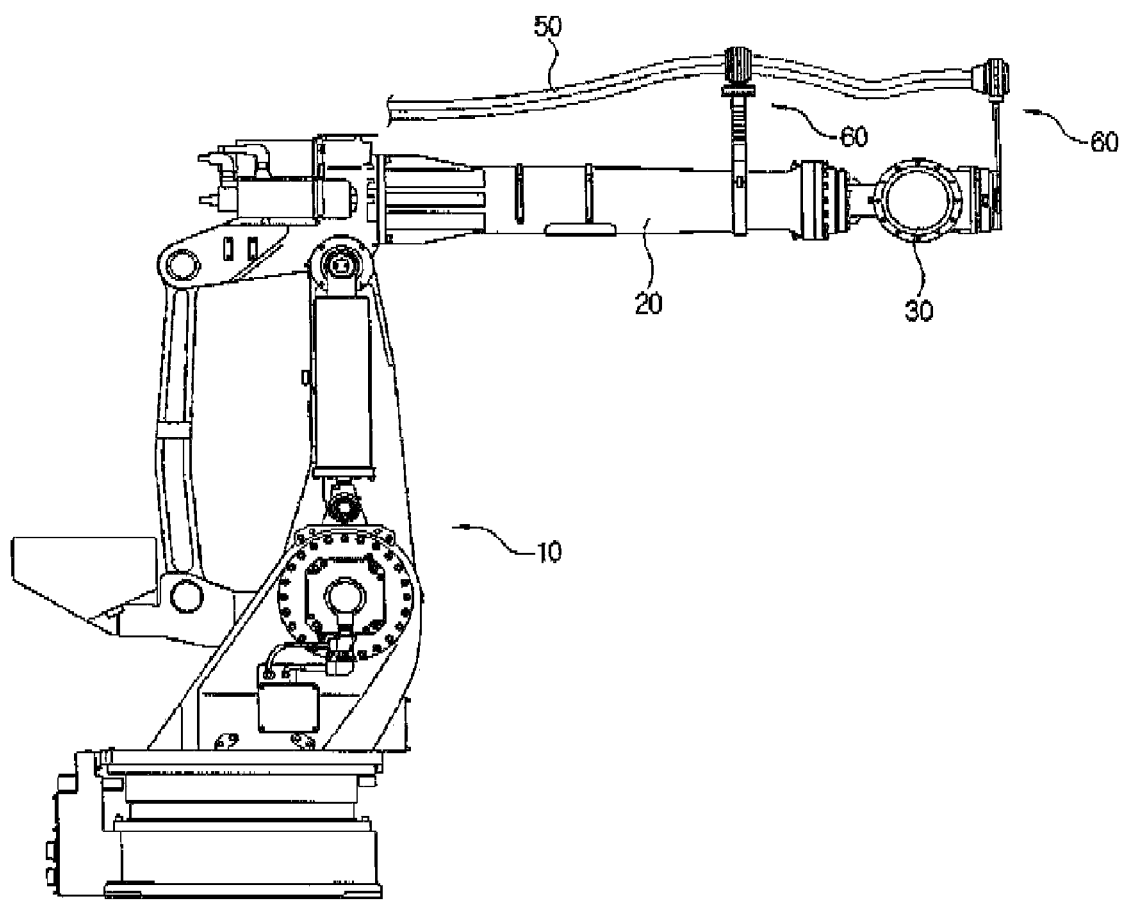
FIG. 1 is a sectional view illustrating a mounting state of a cable guide device for an industrial robot according to an exemplary embodiment of the present invention.
Figure 2:
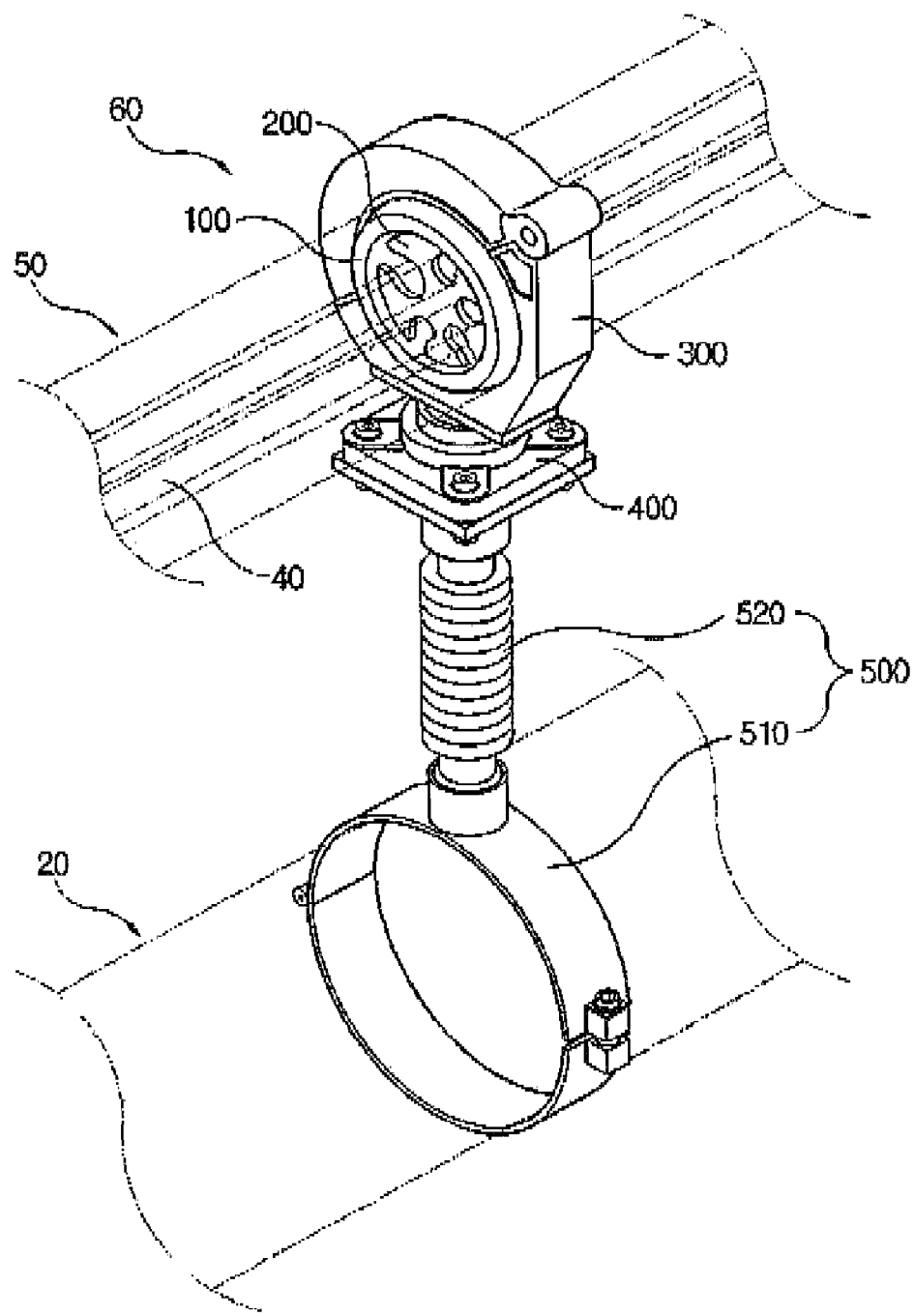
FIG. 2 is a perspective view illustrating the cable guide device for an industrial robot according to an exemplary embodiment of the present invention.
Figure 3:
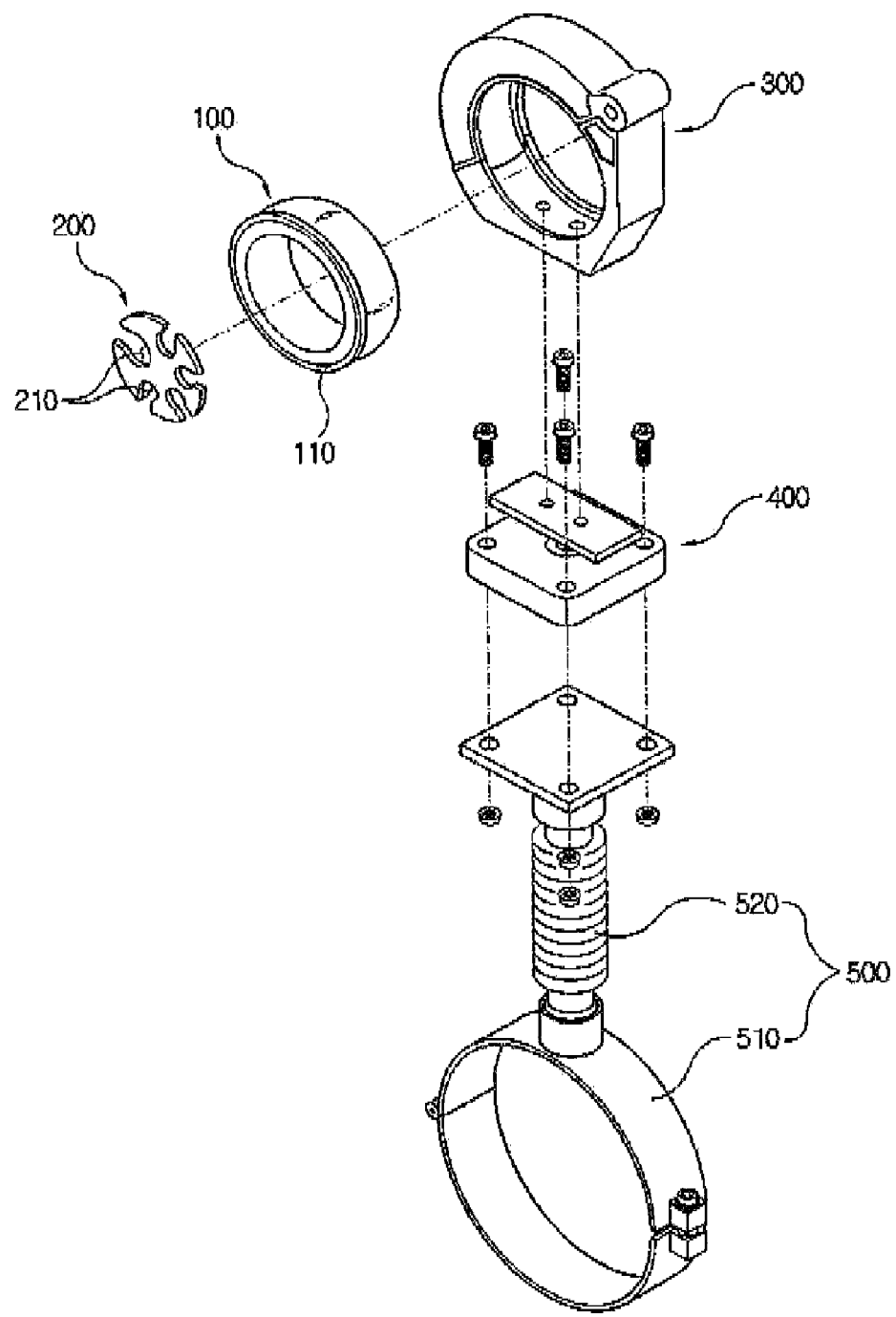
FIG. 3 is an exploded perspective view of FIG. 2.

FIGS. 1 to 3 are a sectional view, an overall perspective view and an exploded perspective view, respectively, illustrating a cable guide device for an industrial robot according to a preferred embodiment of the present invention.

As shown in the drawings, a cable guide device 60 for an industrial robot 10 of this embodiment includes a tube ring 100, a cable distributor 200, a tube clamp 300, a head coupling unit 400, and a clamp supporting unit 500.

The tube ring 100 is a member having a ring shape, an inner peripheral surface of which is rotatably coupled to an outer peripheral surface of the cable tube 50 of the industrial robot 10.

Preferably, the tube ring 100 has a shape such that an outer peripheral surface is convexly curved as it progresses from both edge portions to a substantially middle portion.

The tube ring 100 may be provided with a separation preventing protrusion 110 protrudingly formed around one edge portion of the outer peripheral surface, to prevent the separation of the tube clamp 300 fitted around the outer peripheral surface of the tube ring 100.

Figure 4:
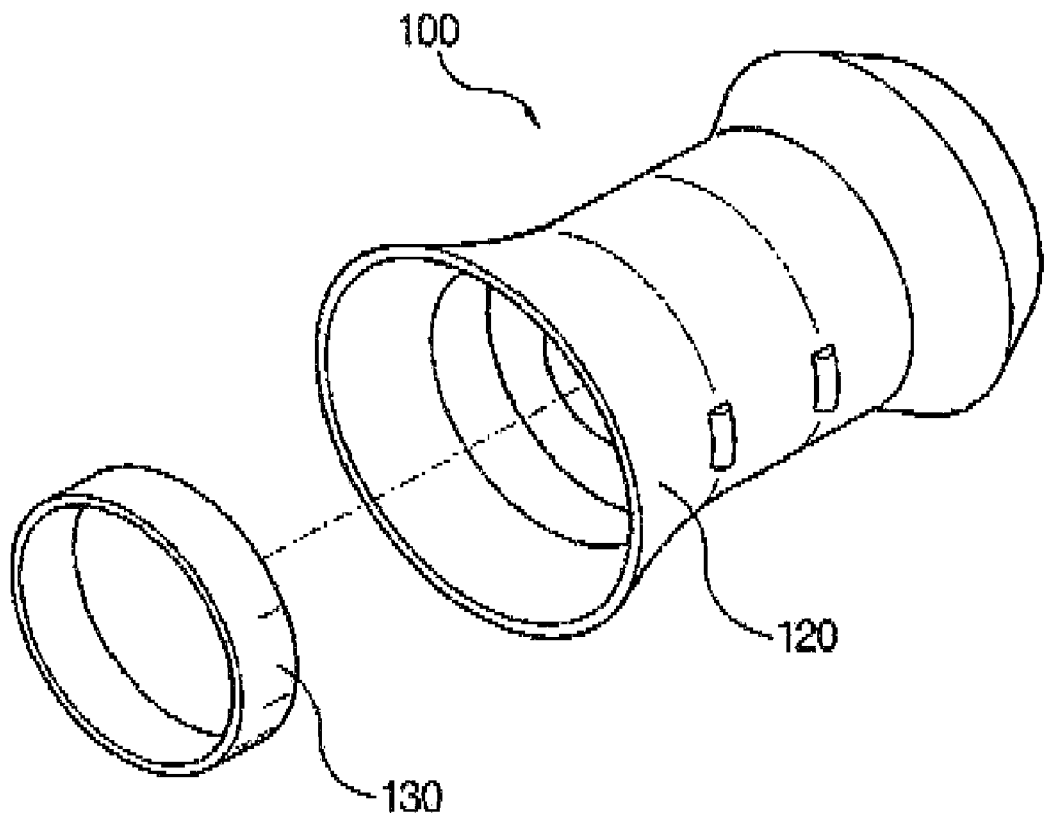
FIG. 4 is a perspective view illustrating modified example of a tube ring depicted in FIG. 3.

FIG. 4 shows a modified example of the tube ring 100. The modified tube ring 100 is provided with a cover member 120 which extends in a pipe shape from one end of the tube ring 100, so as to prevent bending of the cable tube 50 by surrounding the outer peripheral surface of the cable tube 50 of the industrial robot 10.

Preferably, between the cover member 120 of the tube ring 100 and the cable tube 50 is provided a flexible pipe 130. The flexible pipe 130 enables the cable tube 50 to smoothly rotate while decreasing rotational friction which would otherwise be generated due to the direct contact of the inner peripheral surface of the cover member 120 of the tube ring 100 and the outer peripheral surface of the cable tube 50.

The cable distributor 200 is a member to prevent the cables 40 introduced into the cable tube 50 of the industrial robot 10 from being twisted with each other inside the cable tube 50.

The cable distributor 200 is formed with a plurality of cable inserting holes 210. The cable distributor 200 is fitted into the tube ring 100.

The cables 40 introduced into the cable tube 50 of the industrial robot 10 pass respectively through the cable inserting holes 210. Accordingly, the movement of the cables 40 inside the cable tube 50 is minimized, and thereby twist or bending of the cables is prevented.

Figure 5A:
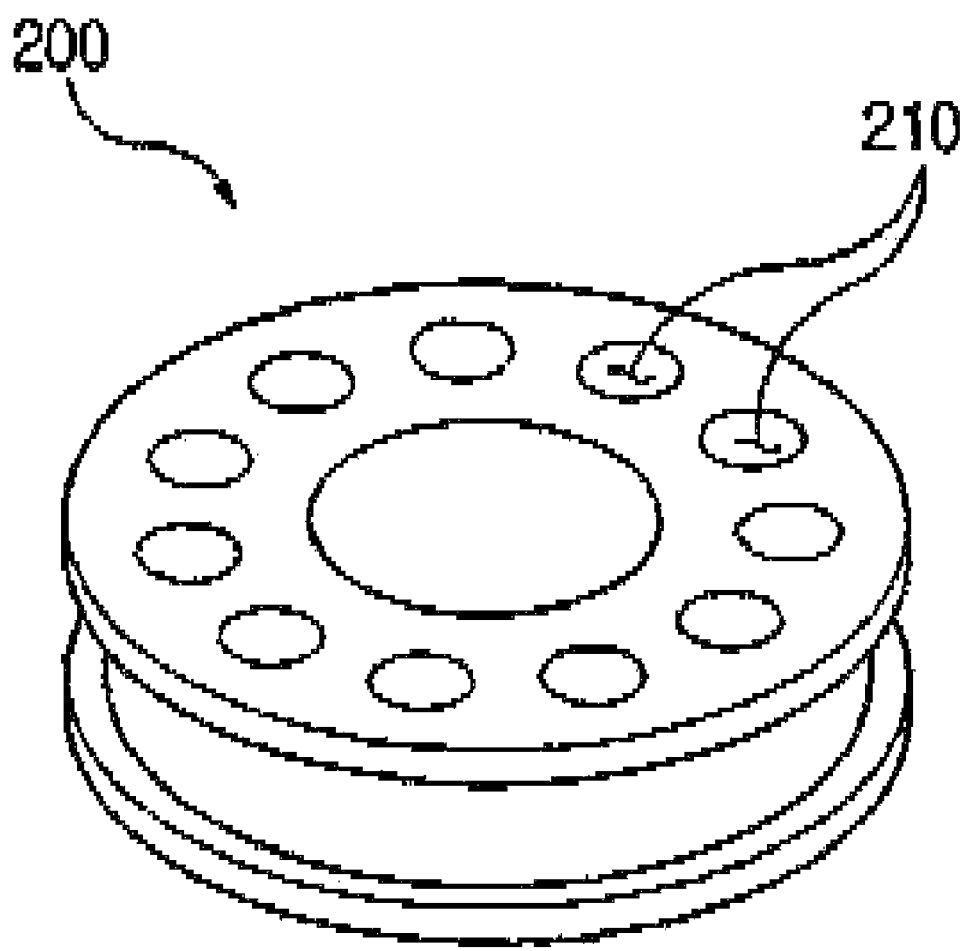
FIGS. 5a and 5b are perspective views illustrating modified examples of a cable distributor depicted in FIG. 3.
Figure 5B:
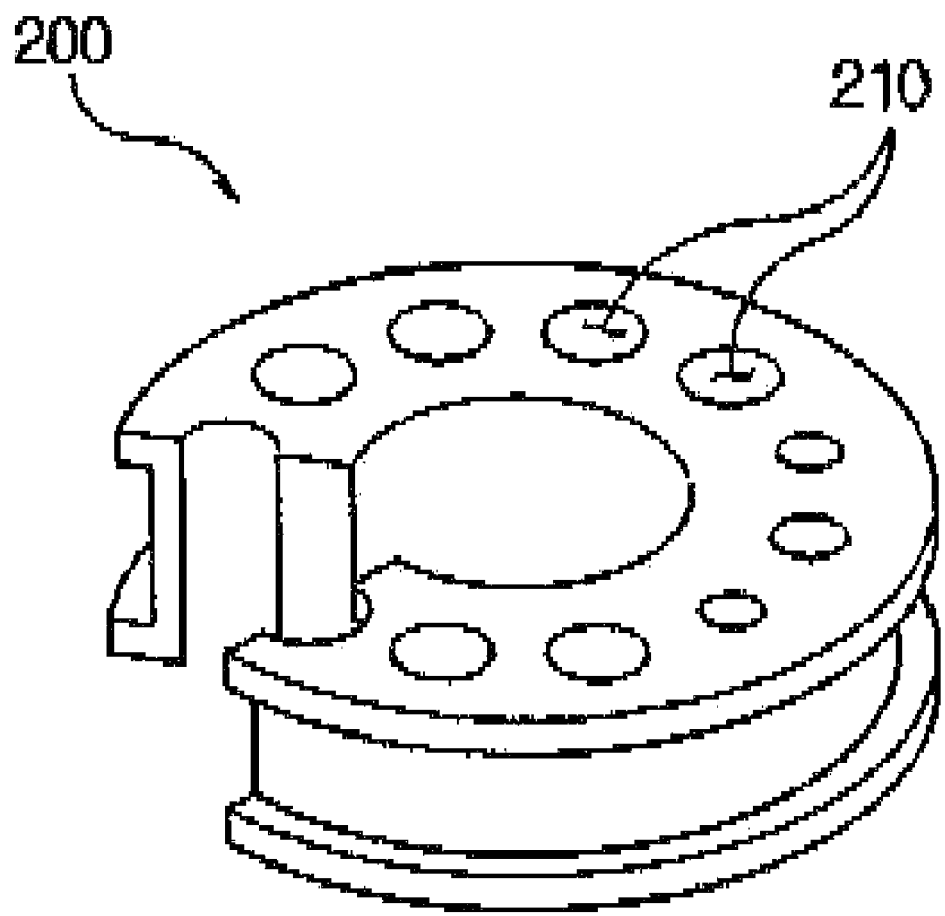

FIGS. 5a and 5b are views illustrating modified examples of the cable distributor 200.

The tube clamp 300 is a member having a ring shape, which is rotatably fitted around the outer peripheral surface of the tube ring 100.

So as not to be separated from the outer peripheral surface of the tube ring 100, the tube clamp 300 has an inner peripheral surface formed in a shape corresponding to the shape of the outer peripheral surface of the tube ring 100.

In other words, it is preferred that the inner peripheral surface of the tube clamp 300 is concavely curved as it progresses from both edge portions to a substantially middle portion.

The head coupling unit 400 is coupled to a side portion of the tube clamp 300.

Figure 6A:
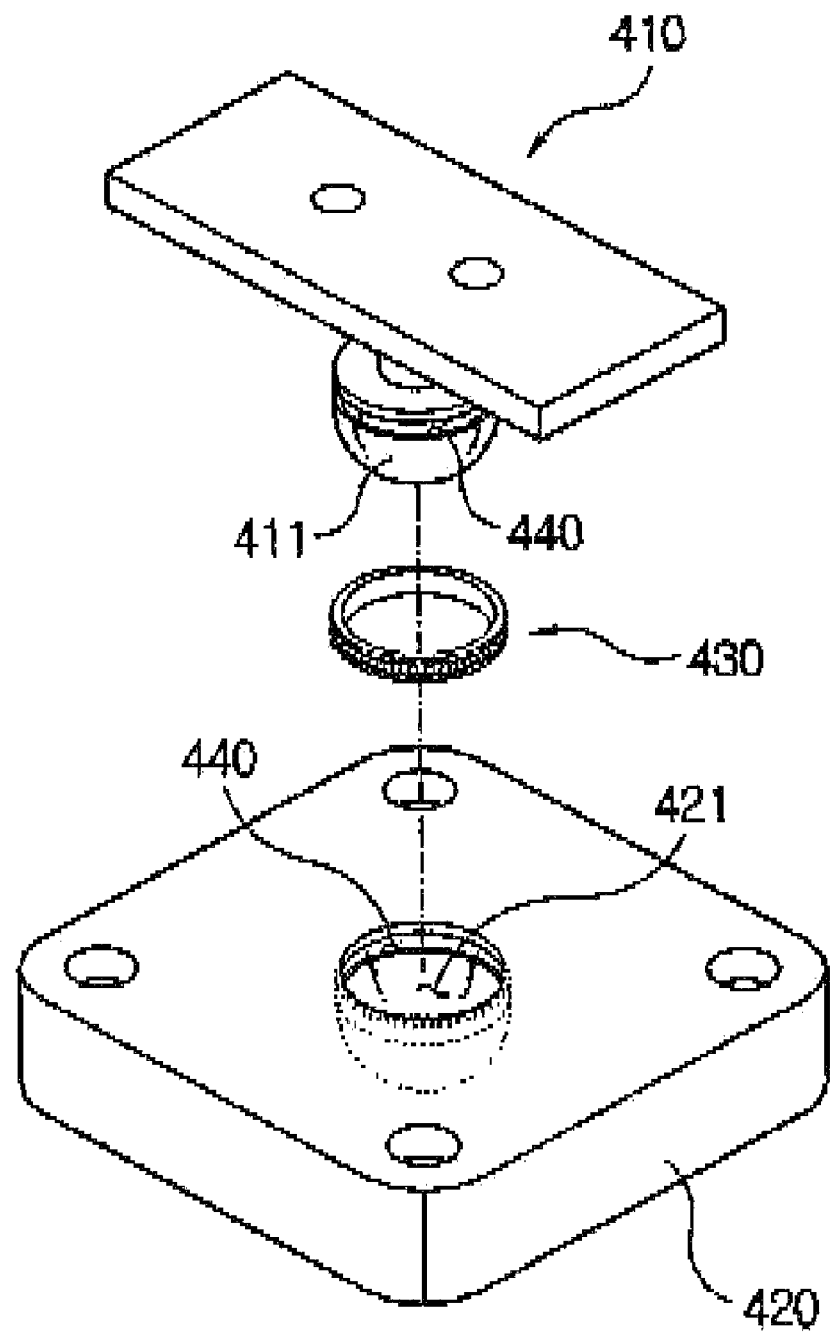
FIGS. 6a and 6b are an exploded perspective view and a coupled sectional view of a head coupling unit depicted in FIG. 3, respectively.
Figure 6B:
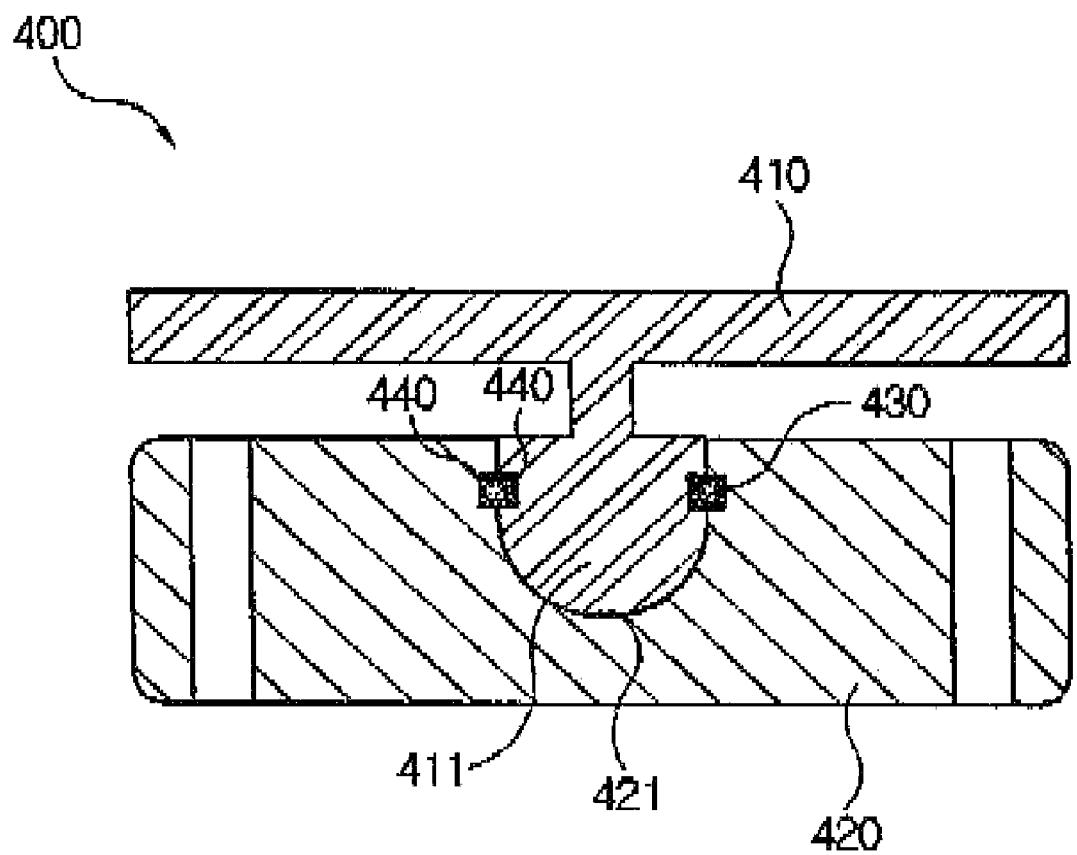

As shown in FIGS. 6a and 6b, the head coupling unit 400 includes a rotating shaft 410 which has a plate part at one end portion to be coupled to the tube clamp 300 and a protruding part 411 at the other end portion. The protruding part 411 is formed with a rotating groove 440 around an outer peripheral surface thereof.

The head coupling unit 400 further includes a rotating bracket 420 which is formed with a shaft rotating recess 421 on an upper surface to receive the protruding part 411 of the rotating shaft 410. The shaft rotating recess 421 is formed with a rotating groove 440 around an inner peripheral surface thereof. The rotating bracket 420 has a lower surface which is coupled to the clamp supporting unit 500.

Between the rotating groove 440 of the rotating shaft 410 and the rotating groove 440 of the shaft rotating recess 421 is provided a ball bearing 430, so that the protruding part 411 of the rotating shaft 410 can be securely received in the shaft rotating recess 421 of the rotating bracket 420 and can smoothly rotate without separation.

Figure 7A:
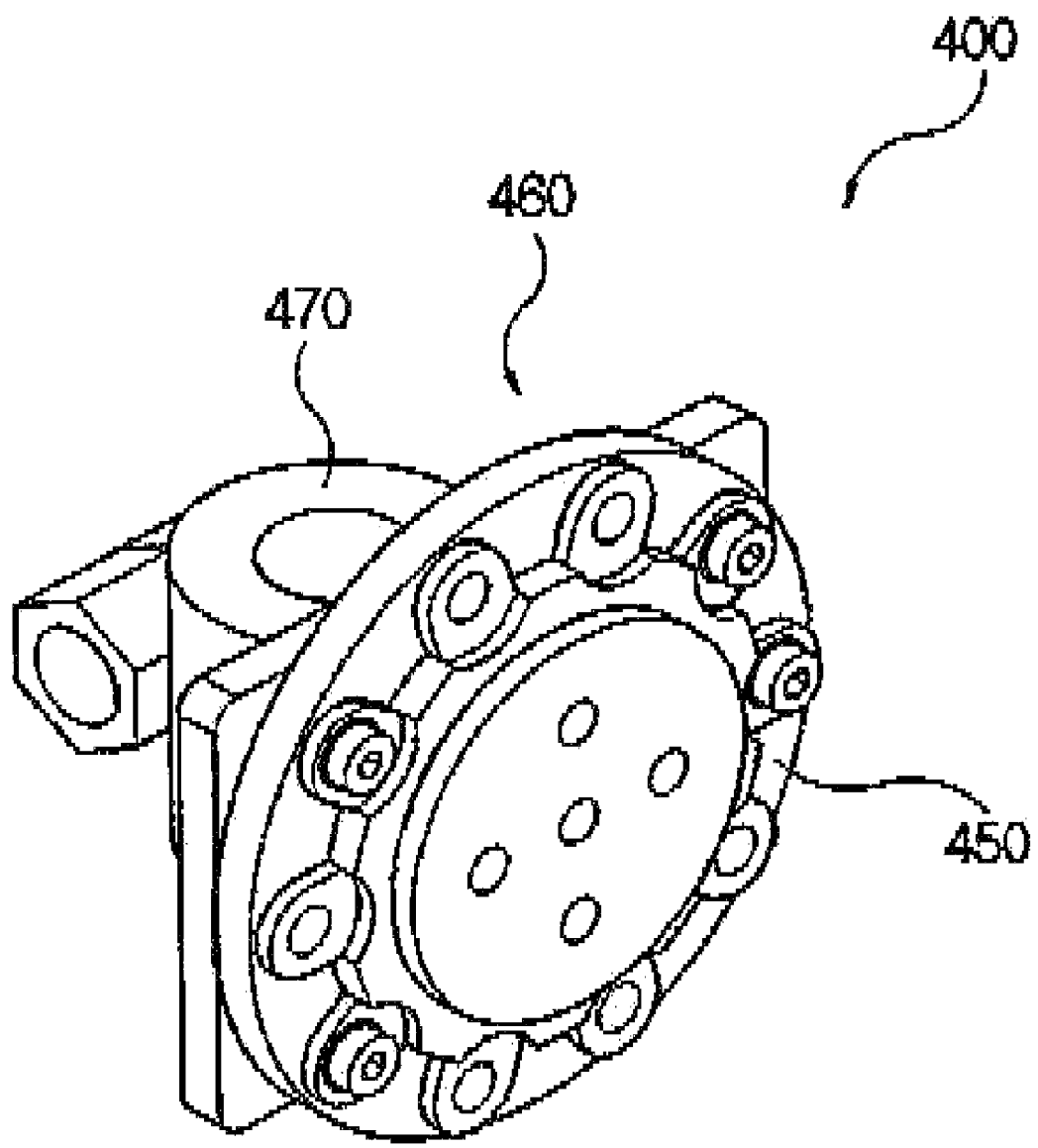
FIGS. 7a and 7b are a coupled perspective view and an exploded perspective view of a modified example of a head coupling unit depicted in FIG. 3, respectively.
Figure 7B:
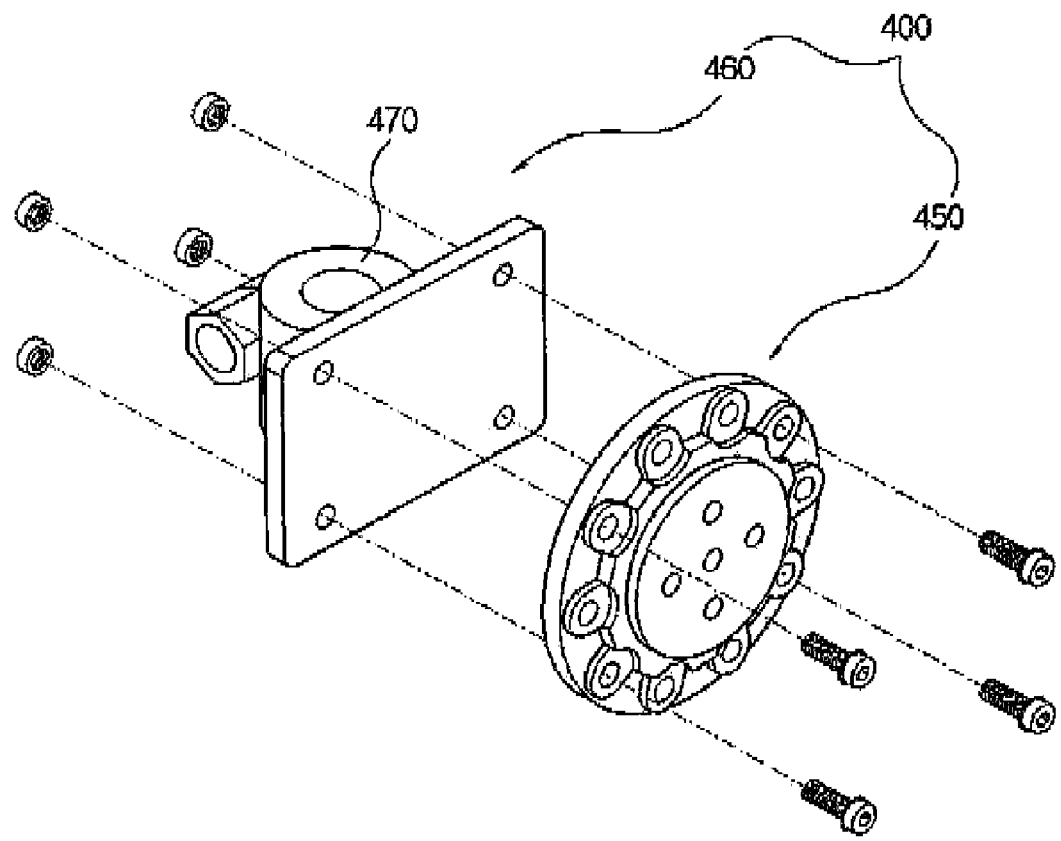

FIGS. 7a and 7b show a modified example of the head coupling unit 400. The modified head coupling unit 400 is used when it is intended to be mounted to the tube clamp 300 positioned at the head 30 of the industrial robot 10.

The head coupling unit 400 includes a plate-shaped head bracket 450 which is coupled to a portion of the tube clamp 300, and a connecting bracket 460 which is coupled to a portion of the head bracket 450. The connecting bracket 460 has a coupling pipe 470 into which one end portion of the clamp supporting unit 500 is insertedly coupled.

The clamp supporting unit 500 is used to keep the cable tube 50 of the industrial robot 10 at a predetermined distance away from the outer surface of the arm 20.

The clamp supporting unit 500 is mounted in such a way that one end portion is fitted around the outer surface of the arm 20 of the industrial robot 10 and the other end portion is coupled to the head coupling unit 400.

Describing in detail, the clamp supporting unit 500 includes a clamp support ring 510 which is fitted around the outer surface of the arm 20 of the industrial robot 10, and a spring shaft 520, one end portion of which is coupled to the clamp support ring 510 and the other end portion of which is coupled to the head coupling unit 400.

When the cable tube 50 shakes by the operation of the head 30 of the industrial robot 10, the spring shaft 520 of the clamp supporting unit 500 can be bent in forward/backward and left/right directions, thereby preventing the cables 40 in the cable tube 50 from being bent largely.

When the operation of the head 30 of the industrial robot 10 is stopped, the spring shaft 520 of the clamp supporting unit 500 is restored to its original position. Accordingly, twist of the cables 40 due to the position change, i.e., the length change of the cable tube 50 can be prevented.

Figure 8:
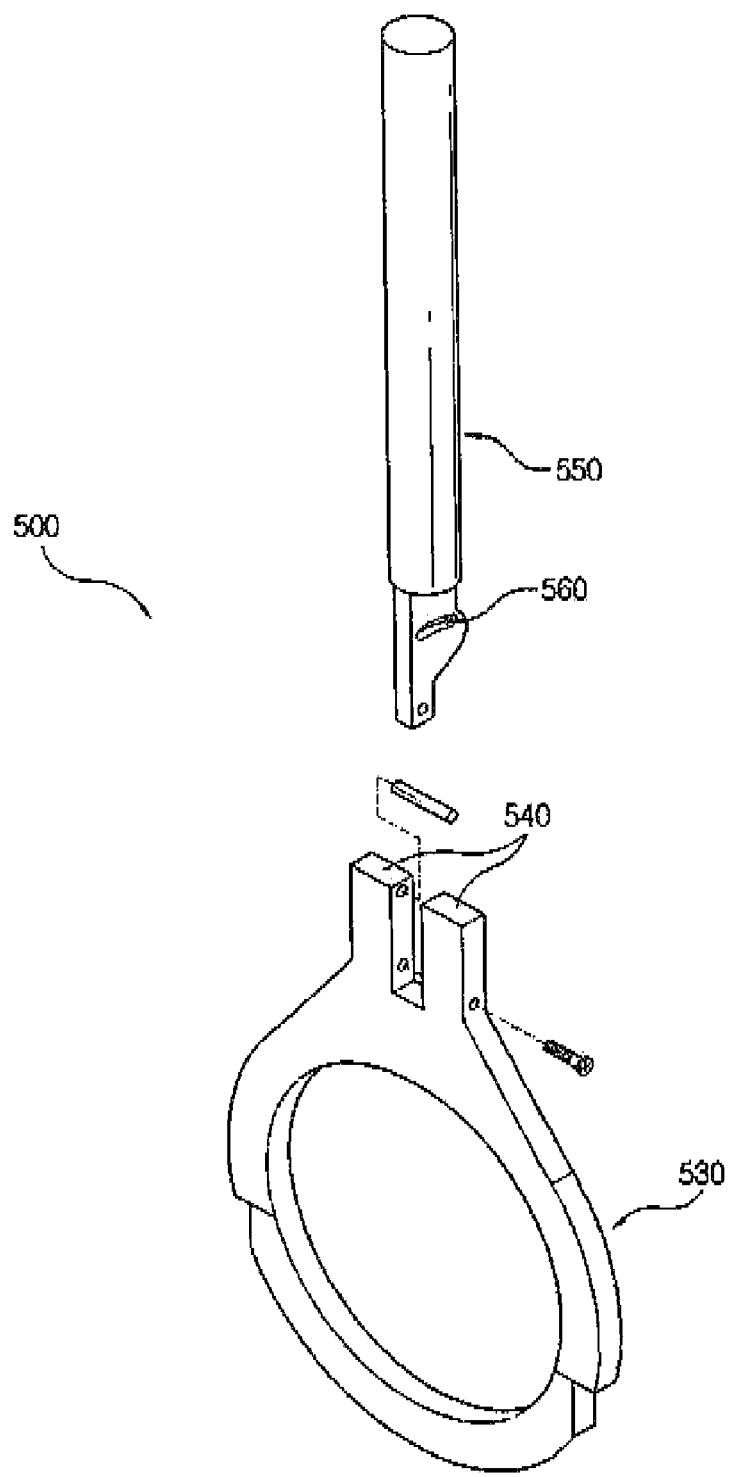
FIG. 8 is a perspective view illustrating a modified example of a clamp supporting unit depicted in FIG. 3.

FIG. 8 shows a modified example of the clamp supporting unit 500.

As shown in the drawing, the clamp supporting unit 500 includes a clamp support ring 530 which is fitted around the outer surface of the arm 20 of the industrial robot 10, and a connecting shaft 550, a first end portion of which is coupled to the clamp support ring 530 and a second end portion of which is coupled to the head coupling unit 400. The clamp support ring 530 is provided with a pair of coupling protrusions 540 which oppose each other with a predetermined gap therebetween. The connecting shaft 550 is formed with a coupling slot 560 at the first end portion. The first end portion of the connecting shaft 550 is rotatably interposed between the pair of coupling protrusions 540 of the clamp support ring 530 by a pin fitted through the coupling protrusions 540 and the coupling slot 560 of the connecting shaft 550.

The connecting shaft 550 coupled to the clamp support ring 530 by the pin can rotate in the forward/backward direction depending on a length of the coupling slot 560. Thus, when the head 30 of the industrial robot 10 operates, the cable tube 50 can easily move in the forward/backward direction while being spaced at a predetermined distance from the outer surface of the arm 20. Accordingly, the cable tube 50 can move smoothly, and thus can be prevented from being twisted.

Figure 9:
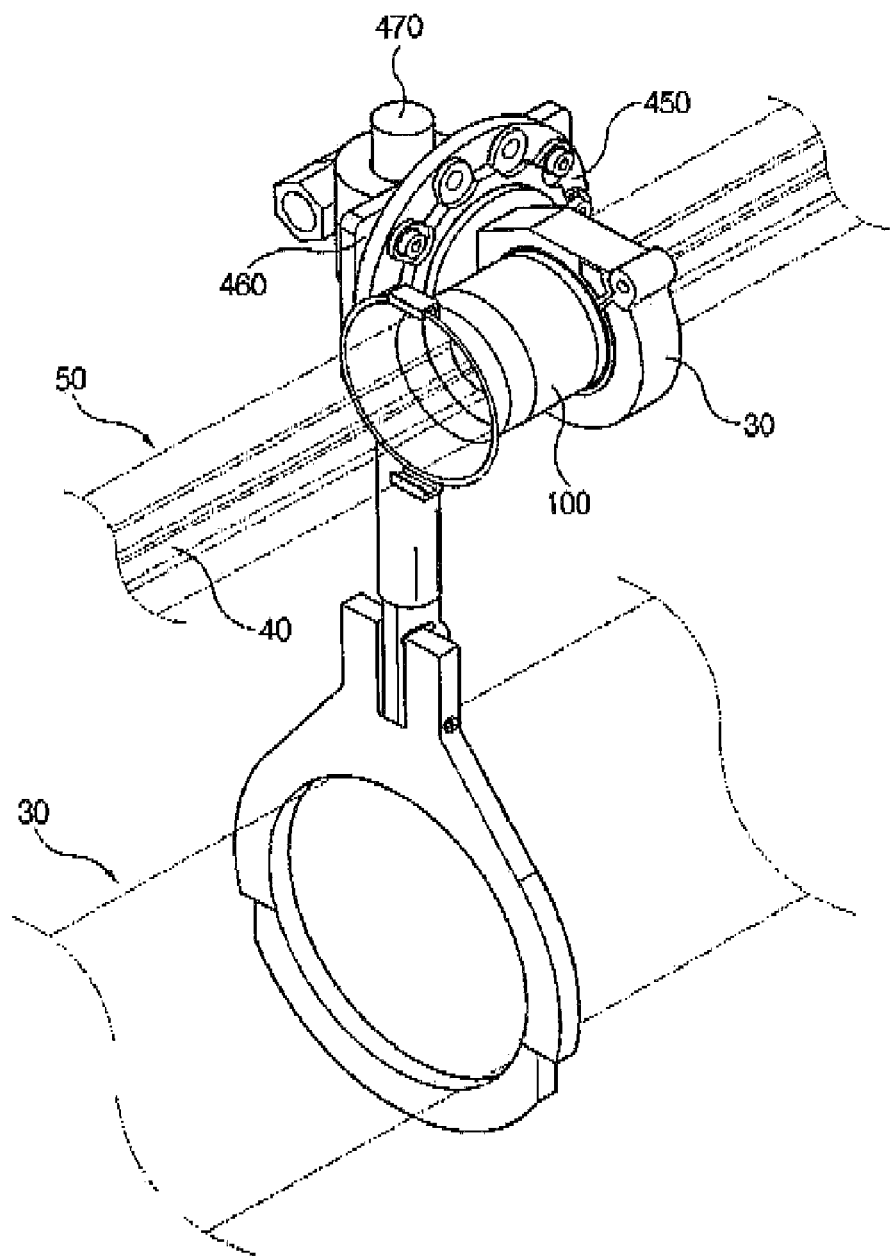
FIG. 9 is a perspective view illustrating a cable guide device for an industrial robot according to another exemplary embodiment of the present invention.

FIG. 9 is a coupled perspective view of the above-described modified examples of the tube clamp 300, the head coupling unit 400 and the clamp supporting unit 500, which are used when they are intended to be mounted primarily to the head 30 of the industrial robot 10.

In the cable guide device 60 for the industrial robot 10 as described above, when the head 30 of the industrial robot 10 operates, the cable tube 50 can move smoothly while being spaced at a predetermined distance from the outer surface of the arm 20 by the clamp supporting unit 500 capable of being bent in the forward/backward and left/right directions. Accordingly, twist of the cables 40 can be prevented.

Also, when the head 30 operates, the cable tube 50 can shake without being twisted or bent by virtue of the tube clamp 300 rotatably fitted around the tube ring 100 coupled to the cable tube 50 of the industrial robot 10 and the head coupling unit 400 enabling the rotation of the tube clamp 300.

As apparent from the above description, the cable guide device for an industrial robot according to the present invention can prevent damage of the cable tube, because the tube clamp, the head coupling unit and the clamp supporting unit support the cable tube so that the cable tube can move in the forward/backward and left/right directions without being twisted or bent while being spaced at a predetermined distance from the outer surface of the arm when the head of the industrial robot operates.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cable guide device for an industrial robot to prevent a plurality of cables and a cable tube enveloping the cables between an arm and a head of the industrial robot from being twisted or bent or damaged due to contact with an outer surface of the arm during operation of the robot, the device comprising:
    a tube ring coupled to an end portion of the cable tube of the industrial robot;
    a cable distributor insertedly coupled in the tube ring, the cable distributor having a plurality of cable inserting holes through which the cables introduced into the cable tube of the industrial robot pass;
    a tube clamp rotatably fitted around an outer peripheral surface of the tube ring, the tube clamp having a ring shape;
    a head coupling unit coupled to a portion of the tube clamp; and
    a clamp supporting unit having a first end portion fitted around the outer surface of the arm of the industrial robot and a second end portion coupled to the head coupling unit, the clamp supporting unit keeping the cable tube of the industrial robot at a predetermined distance away from the outer surface of the arm,
    wherein the head coupling unit includes:
        a rotating shaft including a plate part at a first end portion to be coupled to the tube clamp and a protruding part at a second end portion, the protruding part having a rotating groove formed around an outer peripheral surface thereof;
        a rotating bracket including a first surface formed with a shaft rotating recess to receive the protruding part of the rotating shaft and a second surface coupled to the clamp supporting unit, the shaft rotating recess having a rotating groove formed around an inner peripheral surface thereof; and
        a ball bearing provided between the rotating groove of the rotating shaft and the rotating groove of the shaft rotating recess, to enable the protruding part of the rotating shaft to be securely received in the shaft rotating recess of the rotating bracket and to smoothly rotate without separation.

2. The cable guide device for an industrial robot according to claim 1, wherein the tube ring has an outer peripheral surface which is convexly curved as it progresses from both edge portions to a middle portion, and a separation preventing protrusion formed around one of the edge portions, and
    the tube clamp has an inner peripheral surface which is concavely curved as it progresses from both edge portions to a middle portion,
    whereby the tube clamp fitted around the outer peripheral surface of the tube ring is prevented from being separated from the tube ring.

3. The cable guide device for an industrial robot according to claim 1, wherein the tube ring includes a cover member which extends in a pipe shape from one end of the tube ring to prevent bending of the cable tube of the industrial robot by surrounding an outer peripheral surface of the cable tube, and a flexible pipe provided between the cover member and the cable tube,
    whereby the flexible pipe enables the cable tube to smoothly rotate while decreasing rotational friction due to direct contact of an inner peripheral surface of the cover member and the outer peripheral surface of the cable tube.

4. The cable guide device for an industrial robot according to claim 1, wherein the clamp supporting unit includes a clamp support ring fitted around the outer surface of the arm of the industrial robot, and a spring shaft having a first end portion coupled to the clamp support ring and a second end portion coupled to the head coupling unit.

5. The cable guide device for an industrial robot according to claim 1, wherein the clamp supporting unit includes a clamp support ring fitted around the outer surface of the arm of the industrial robot, the clamp support ring having a pair of coupling protrusions opposing each other, and a connecting shaft having a first end portion formed with a coupling slot and a second end portion coupled to the head coupling unit,
    whereby the first end portion of the connecting shaft is rotatably interposed between the pair of coupling protrusions of the clamp support ring by a pin fitted through the coupling protrusions and the coupling slot of the connecting shaft.

* * * * *